US012218490B2

(12) United States Patent
Krauss et al.

(10) Patent No.: US 12,218,490 B2
(45) Date of Patent: Feb. 4, 2025

(54) LIGHTNING-PROTECTION SPARK GAP

(71) Applicant: DEHN SE, Neumarkt i.d.OPf. (DE)

(72) Inventors: Bernhard Krauss, Berg (DE); Stephan Hierl, Neumarkt (DE); Uwe Strangfeld, Nuremberg (DE)

(73) Assignee: DEHN SE, Neumarkt i.d.OPf. (DE)

( * ) Notice: Subject to any disclaimer, the term of this patent is extended or adjusted under 35 U.S.C. 154(b) by 0 days.

(21) Appl. No.: 17/918,298

(22) PCT Filed: Nov. 8, 2021

(86) PCT No.: PCT/EP2021/080993
§ 371 (c)(1),
(2) Date: Oct. 11, 2022

(87) PCT Pub. No.: WO2022/101149
PCT Pub. Date: May 19, 2022

(65) Prior Publication Data

US 2024/0162689 A1 May 16, 2024

(30) Foreign Application Priority Data

Nov. 10, 2020 (DE) ........................ 102020214136.3

(51) Int. Cl.
*H01T 4/10* (2006.01)
*H01T 1/02* (2006.01)
*H01T 4/04* (2006.01)

(52) U.S. Cl.
CPC ................ *H01T 4/10* (2013.01); *H01T 1/02* (2013.01); *H01T 4/04* (2013.01)

(58) Field of Classification Search
CPC .... H01T 4/04; H01T 4/10; H01T 4/14; H01T 1/02

(Continued)

(56) References Cited

U.S. PATENT DOCUMENTS 9,019,680 B2 4/2015 Hierl et al. .................. 361/137
9,083,153 B2 7/2015 Ehrhardt et al.
(Continued)

FOREIGN PATENT DOCUMENTS

DE 142511 C 6/1902 .............. H01T 4/14
DE 102005015401 A1 7/2006 .............. H01T 1/04
(Continued)

OTHER PUBLICATIONS

Machine translation of Ehrhardt et al. German Patent Document DE 10 2013112400 A1 Jun. 2014 (Year: 2014).*
(Continued)

*Primary Examiner* — Kevin J Comber
(74) *Attorney, Agent, or Firm* — Bodner & Bodner, PLLC; Christian P. Bodner; Gerald T. Bodner

(57) ABSTRACT

The present invention relates to a lightning-protection spark gap, comprising a housing (G); a first electrode (3*a*), and a second electrode (3*b*), which diverge from each other; wherein, between the first inner side (Ia) of the first electrode (3*a*) and the second inner side (Ib) of the second electrode (3*b*), an ignition region (Z) and a subsequent propagation region (L) for an arc are formed; wherein the housing (G) forms an arc chamber (LK), which is arranged between the first and second electrodes (3*a*, 3*b*) and which is delimited by a quenching chamber (4); wherein, in the housing (G), at least one gas circulation channel (K1) is configured, by means of which a gas flow escaping from the quenching chamber (40) can be returned to the arc chamber (LK) via a first cut-out (V1; V1'; V1"; V1"') in the propagation region (L) of the first electrode (3*a*).

10 Claims, 7 Drawing Sheets

(58) Field of Classification Search
USPC .......................................................... 361/137
See application file for complete search history.

(56) References Cited

U.S. PATENT DOCUMENTS

| | | | | | |
|---|---|---|---|---|---|
| 2013/0208388 | A1* | 8/2013 | Ehrhardt | H01T 4/14 | |
| | | | | 361/137 | |
| 2013/0235502 | A1* | 9/2013 | Hierl | H01T 4/14 | |
| | | | | 361/137 | |

FOREIGN PATENT DOCUMENTS

| | | | | |
|---|---|---|---|---|
| DE | 102011051738 A1 | 2/2012 | | H01T 1/08 |
| DE | 102011102257 A1 | 2/2012 | | H01T 1/02 |
| DE | 102005015401 B4 | 3/2014 | | H01T 1/04 |
| DE | 102013112400 A1 * | 6/2014 | | H01T 1/02 |
| EP | 0917265 A1 | 5/1999 | | H01T 4/14 |
| EP | 0917265 B1 | 2/2005 | | H01T 4/14 |
| EP | 1836752 B1 | 2/2011 | | H01T 4/14 |
| WO | WO-2006074721 A1 * | 7/2006 | | H01T 4/04 |

OTHER PUBLICATIONS

Machine translation of Ehrhardt et al. International Patent Document WO 2006074721 A1 Jul. 2006 (Year: 2006).*
The Written Opinion of the International Searching Authority, in German, dated Apr. 8, 2022, which was issued by the International Bureau of WIPO in Applicant's corresponding international PCT application having Serial No. PCT/EP2021/080993, filed on Nov. 8, 2021.
The International Search Report, in English, dated Apr. 8, 2022, which was issued by the International Bureau of WIPO in Applicant's corresponding international PCT application having Serial No. PCT/EP2021/080993, filed on Nov. 8, 2021.
Office Action (in Hindi and English), dated Dec. 14, 2023, issued by the Indian Patent Office for Applicant's related Indian Patent Application No. IN202317008856.

* cited by examiner

LIGHTNING-PROTECTION SPARK GAP

The present invention relates to a lightning-protection spark gap having mutually diverging electrodes according to the introductory clause of claim 1, as known from DE 10 2005 015 401 A1.

Although applicable to any arbitrary lightning-protection spark gaps having mutually diverging electrodes, the present invention, and the issue giving rise thereto, are described with respect to lightning-protection spark gaps having mutually diverging electrodes which comprise a quenching chamber having a plurality of arc splitter plates.

PRIOR ART

DE 10 2011 051 738 A1 discloses a lightning-protection spark gap having mutually diverging electrodes, wherein the clearance between opposing electrode surfaces in the ignition region is narrow, and broadens in the propagation region. Pulse current loading is thus essentially limited to the ignition region, whereas secondary currents flow along the mutually diverging electrodes in the propagation region, and the secondary current arc is split and quenched in a quenching chamber.

The generic document DE 10 2005 015 401 A1 discloses a lightning-protection spark gap having two mutually diverging electrodes and a spark gap acting between the electrodes, a housing, creepage spark support means acting at the root of the electrodes and means for the magnetic blow-out of the arc, wherein the mobility of the arc directly after the ignition thereof is increased by a combination of measures for the amplification of the arc-related self-magnetic field and a staggered circulation of gas in the arrester of encapsulated design. In particular, the electrodes comprise rectangular cut-outs for the circulation of gas.

In lightning-protection spark gaps of this type, during the pulse current phase, it must be ensured that power conversion in the arc is maintained as low as possible which, in the light of the injected current associated with the pulse function, can only be achieved by means of the lowest possible arcing voltage. The lowest possible arcing voltage is particularly achievable by means of the shortest possible arc length in the ignition region.

It is intended that the arc should remain in this ignition region during the pulse current phase. Were the arc to be propagated to the arc quenching chamber during the pulse phase, this would result in an extreme loading of the spark gap.

During the secondary current phase, limitation and interruption of the secondary current supplied by the low-voltage grid is required. This can be achieved by means of the highest possible arcing voltage, which functions as a counter-voltage to the grid voltage.

In order to achieve the highest possible arcing voltage, it is thus intended that the arc, further to the completion of the pulse current phase, should be propagated to the arc quenching chamber as rapidly as possible.

In particular, at cut-outs which, according to the prior art, constitute a structural inconsistency, "immobilization" of the arc root can occur, thereby resulting, in this case, in unwanted thermal overloading.

FIGS. 5*a*)-*d*) show schematic views for the illustration of a lightning-protection spark gap which is known from DE 10 2005 015 401 B4.

The known lighting-protection spark gap comprises a first electrode 3*a*, having a first outer side Aa and a first inner side Ia. The lightning-protection spark gap further comprises a second electrode 3*b*, having a second outer side Ab and a second inner side 1*b*. The first and second electrodes 3*a*, 3*b* are arranged in a housing G, the trough-shaped underside of which is represented. The housing cover is not represented.

The first and second electrodes 3*a*, 3*b* are formed of a conductive material. In the present example, this material is special steel or copper, or an alloy thereof. The first and second electrodes 3*a*, 3*b* diverge from each other.

Between the first inner side Ia of the first electrode 3*a* and the second inner side of the second electrode 3*b*, an ignition region Z and a subsequent propagation region L for an arc are formed. In the ignition region Z, the first electrode 3*a* and the second electrode 3*b* are closely spaced, whereas the clearance therebetween expands continuously in the propagation region L. Where the (unrepresented) housing cover is fitted, an arc chamber LK is formed between the first and second electrodes 3*a*, 3*b*.

At the end of the propagation region L, a quenching chamber 4 is located in the arc chamber LK, comprising a plurality of parallel-oriented arc splitter plates 40, and to which gas outlet channels 45 connect. The quenching chamber is laterally enclosed by the end regions 5*a*, 5*b* of the first and second electrodes 3*a*, 3*b*.

Between the housing G and the outer side Aa of the first electrode 3*a*, a first gas circulation channel K1 is formed and, between the housing G and the outer side Ab of the second electrode 3*b*, a second gas circulation channel K2 is formed.

The first electrode 3*a* is connected to a first electric terminal contact 1*a* via a connecting region 6*a*, and the second electrode 3*a* is connected to a second electric terminal contact 1*b* via a connecting region 6*b*. The first and second electric terminal contacts 1*a*, 1*b*, are led out through the wall of the housing, such that an electrical connection to an electric power grid which is to be protected against lightning stroke can be formed.

On the outer side Aa of the first electrode, additionally, a ferromagnetic concentrator F1 is provided opposite the propagation region L.

In the propagation region L, at the end of the ignition region Z, the first electrode 3*a* comprises symmetrically opposing first cut-outs V01 and, in the propagation region L, at the end of the ignition region Z, the second electrode 3*a* comprises symmetrically opposing second cut-outs V02.

The first cut-outs V01 form a fluidic connection between the first gas circulation channel K1 and the arc chamber LK, and the second cut-outs V02 form a fluidic connection between the second gas circulation channel K2 and the arc chamber LK.

In the event of lightning stroke, in a first phase, lightning energy is essentially converted into a pulse current in the ignition region Z whereas, in a second phase, in the propagation region L, a secondary arc which is driven by a secondary current is propagated in the direction of the arc quenching chamber 4.

The gas flow produced by the generation of an arc is conducted via the gas outlet channels 45 into the first and second gas circulation channels K1, K2 and, via the first and second cut-outs V1, V2 is at least partially fed back to the arc chamber LK, in order to support the motion of the arc.

According to the prior art, as represented in FIG. 5*c*) and d), the rectangular trough-shaped cut-outs V01, V02 are configured symmetrically, with respect to their longitudinal extension in the propagation direction of the arc, and comprise rectangular corners E and E'.

Although cut-outs V01, V02 of this type produce good results for smaller arcs, larger arcs, in many cases, continue to be retained at the second edge KA of the cut-outs V01, V02.

DISCLOSURE OF THE INVENTION

The present invention provides a lightning-protection spark gap, as claimed in claim 1.

Preferred further developments are the subject matter of the respective subclaims.

Advantages of the Invention

The core element of the present invention is the asymmetrical shape of cut-outs in the electrode or electrodes in the propagation direction of the arc, wherein a reduction from a first cross-section to a minimum cross-section proceeds over an essentially shorter path than a subsequent increase from the minimum cross-section to a second cross-section, which preferably corresponds to the first cross-section.

The present invention thus permits an increase in the speed of propagation of the arc to the electrodes, in response to a secondary current, and prevents any suspension of the arc in the cut-outs.

According to a preferred embodiment, the first electrode comprises two first cut-outs, which are arranged in symmetrical opposition. This increases the efficiency of gas circulation.

According to a further preferred embodiment, at least one second gas circulation channel is configured in the housing, by means of which a gas flow escaping from the quenching chamber in the event of lightning stroke can be returned to the arc chamber via at least one second cut-out in the propagation region of the second electrode; wherein the second cut-out is configured asymmetrically with respect to a longitudinal extension of the second cut-out in the propagation direction of the arc; wherein the second cut-out, in the propagation direction of the arc, decreases from a first cross-section of the second electrode to a minimum cross-section of the second electrode over a first distance, and increases from the minimum cross-section of the second electrode to a second cross-section of the first electrode over a second distance; and wherein the first distance is shorter than the second distance. This further improves the efficiency of gas circulation.

According to a further preferred embodiment, the second electrode also comprises two second cut-outs, which are arranged in symmetrical opposition.

According to a further preferred embodiment, the first cross-section and the second cross-section are equal.

According to a further preferred embodiment, the second distance is at least double the length of the first distance. This permits a particularly uniform escape of the arc from the cut-out or cut-outs.

According to a further preferred embodiment, the first distance is zero.

According to a further preferred embodiment, the first distance and/or the second distance traverses at least one curved section.

According to a further preferred embodiment, the first distance and/or the second distance traverses at least one linear section.

According to a further preferred embodiment, the quenching chamber comprises a plurality of parallel-oriented arc splitter plates, to which gas outlet channels connect, which terminate in the first or second gas circulation channel.

BRIEF DESCRIPTION OF THE DRAWINGS

In the drawings.

In the figures, identical or functionally equivalent elements are identified by the same reference symbols.

DESCRIPTION OF EXEMPLARY EMBODIMENTS

Figure 1A:
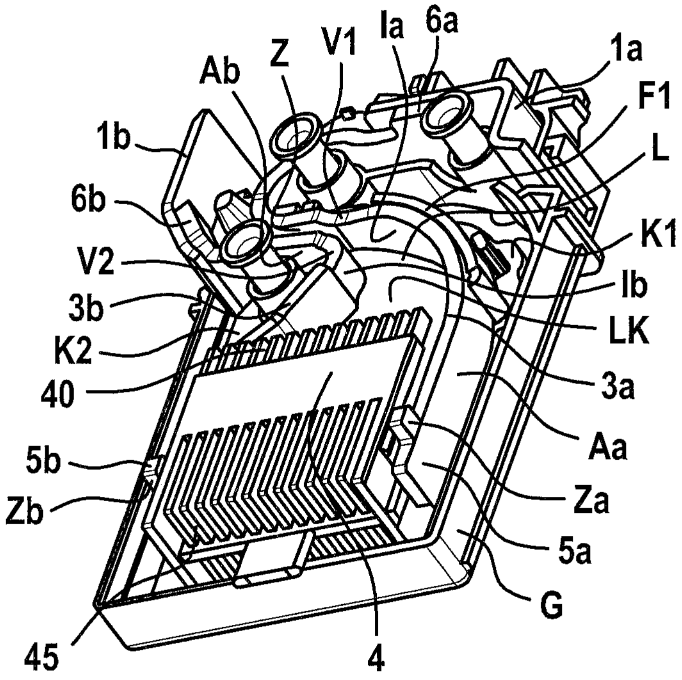
FIGS. 1*a*)-*d*) show schematic views for the illustration of a lightning-protection spark gap according to a first embodiment of the present invention, wherein FIG. 1*a*) is a perspective representation, FIG. 1*b*) is a sectional enlargement of the first electrode, FIG. 1*c*) is a plane overhead view of the inner side of the first electrode, and FIG. 1*d*) is a sectional enlargement of the outline of a cut-out in the first electrode.
Figure 1B:
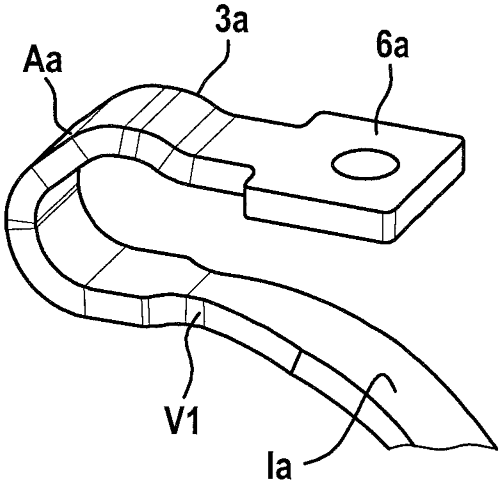
Figure 1C:
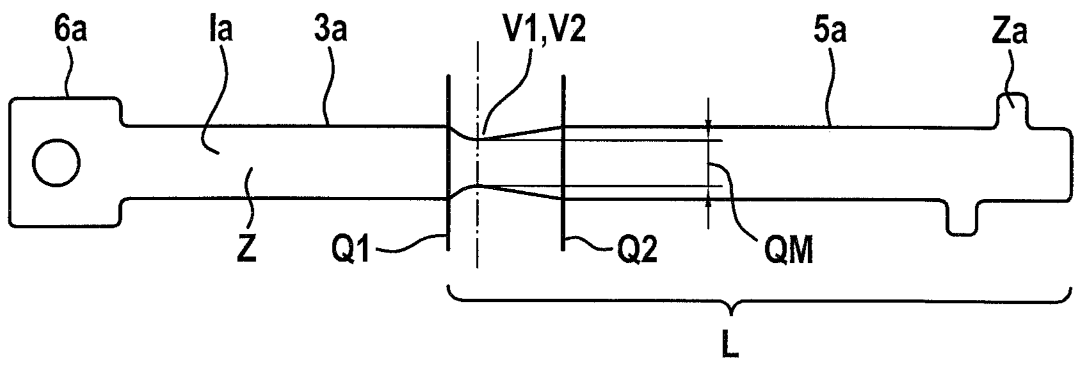
Figure 1D:
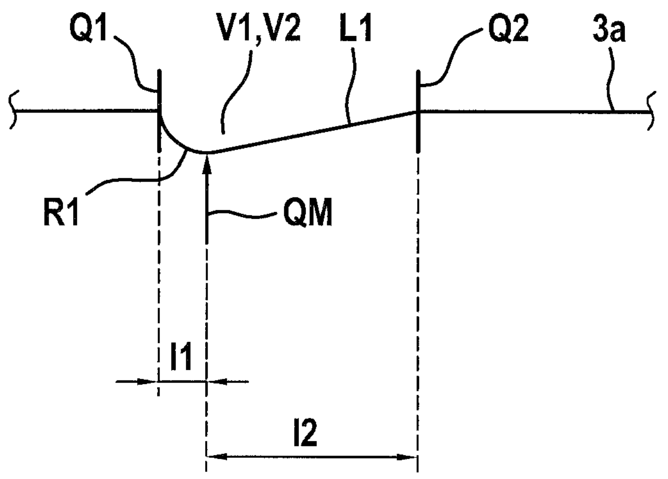

FIGS. 1*a*)-*d*) show schematic views for the illustration of a lightning-protection spark gap according to a first embodiment of the present invention, wherein FIG. 1*a*) is a perspective representation, FIG. 1*b*) is a sectional enlargement of the first electrode, FIG. 1*c*) is a plane overhead view of the inner side of the first electrode, and FIG. 1*d*) is a sectional enlargement of the outline of a cut-out in the first electrode.

The lightning-protection spark gap according to the first embodiment comprises a first electrode 3*a*, having a first outer side Aa and a first inner side Ia. The lightning-protection spark gap further comprises a second electrode 3*b*, having a second outer side Ab and a second inner side Ib. The first and second electrodes 3*a*, 3*b* are arranged in a housing G, the trough-shaped underside of which is represented. The housing cover is not represented.

The first and second electrodes 3*a*, 3*b* are formed of a conductive material. In the present example, the material is special steel or copper, or an alloy thereof. The first and second electrodes 3*a*, 3*b* diverge from each other.

Between the first inner side 1*a* of the first electrode 3*a* and the second inner side of the second electrode 3*b*, an ignition region Z and a subsequent propagation region L for an arc are formed. In the ignition region Z, the first electrode 3*a* and the second electrode 3*b* are closely spaced, whereas the clearance therebetween expands continuously in the propagation region L. Where the (unrepresented) housing cover is fitted, an arc chamber LK is formed between the first and second electrodes 3*a*, 3*b*.

At the end of the propagation region L, a quenching chamber 4 is located in the arc chamber LK, comprising a plurality of parallel-oriented arc splitter plates 40, on which gas outlet channels 45 are located. The quenching chamber is laterally enclosed by the end regions 5*a*, 5*b* of the first and second electrodes 3*a*, 3*b*.

Between the housing G and the outer side Aa of the first electrode 3*a*, a first gas circulation channel K1 is formed and, between the housing G and the outer side Ab of the second electrode 3*b*, a second gas circulation channel K2 is formed.

The first electrode 3*a* is connected to a first electric terminal contact 1*a* via a connecting region 6*a*, and the second electrode 3*a* is connected to a second electric terminal contact 1*b* via a connecting region 6*b*. The first and second electric terminal contacts 1*a*, 1*b* are led out through the wall of the housing, such that an electrical connection to an electric power grid which is to be protected against lightning stroke can be formed. The first and second electrodes 3*a*, 3*b* comprise pins Za, Zb, by means of which the latter engage in corresponding fixing holes in the housing G.

On the outer side Aa of the first electrode, additionally, a ferromagnetic concentrator F1 is provided opposite the propagation region L.

In the propagation region L, at the end of the ignition region Z, the first electrode 3*a* comprises symmetrically opposing first cut-outs V1 and, in the propagation region L, at the end of the ignition region Z, the second electrode 3*a* comprises symmetrically opposing second cut-outs V2. The first cut-outs V1 form a fluidic connection between the first gas circulation channel K1 and the arc chamber LK, and the second cut-outs V2 form a fluidic connection between the second gas circulation channel K2 and the arc chamber LK.

In the event of lightning stroke, in a first phase, lightning energy is essentially converted into a pulse current in the ignition region Z whereas, in a second phase, in the propagation region L, a secondary arc which is driven by a secondary current is propagated in the direction of the arc quenching chamber 4.

The gas flow produced by the generation of an arc is conducted via the gas outlet channels 45 into the first and second gas circulation channels K1, K2 and, via the first and second cut-outs V1, V2 is at least partially fed back to the arc chamber LK, in order to support the motion of the arc.

The specific configuration of first and second cut-outs V1, V2 arranged in opposition on either side of the first or second electrodes 3*a*, 3*b*, as particularly represented in FIGS. 1*c*) and 1*d*), supports the propagation behavior of the arc in the region of the cut-outs V1, V2, and can effectively prevent any retention or suspension of the arc in the region of the cut-outs V1, V2.

The cut-outs V1, V2, represented here by the cut-out V1, in the first embodiment, extend asymmetrically with respect to the longitudinal extension of the cut-outs V1, V2 in the propagation direction of the arc. In particular, the cross-section of the first electrode 3*a* tapers from a first cross-section Q1 to a minimum cross-section QM, in the form of a curved section R1, and then, in a linear section L1, increases continuously up to a cross-section Q2, which corresponds here to a cross-section Q1.

A distance l1 of the curved section R1 is substantially shorter than a distance l2 of the linear section L1.

Figure 2A:
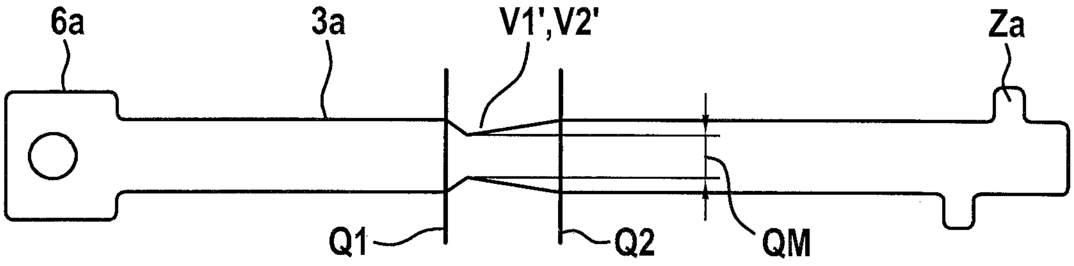
FIGS. 2*a*), *b*) show schematic views for the illustration of a lightning-protection spark gap according to a second embodiment of the present invention, wherein FIG. 2*a*) is a plane overhead view of the inner side of the first electrode, and FIG. 2*b*) is a sectional enlargement of the outline of a cut-out in the first electrode.
Figure 2B:
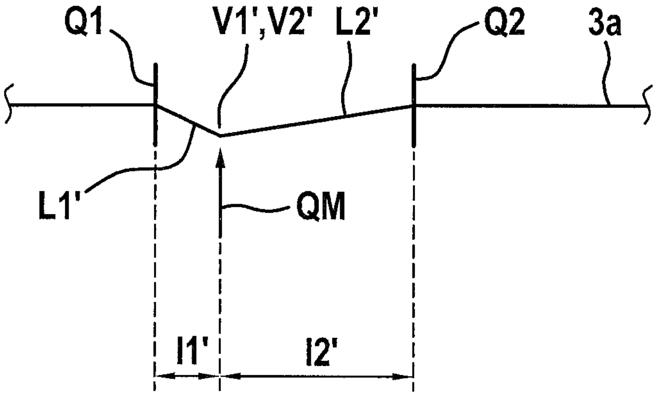

FIGS. 2*a*), *b*) show schematic views for the illustration of a lightning-protection spark gap according to a second embodiment of the present invention, wherein FIG. 2*a*) is a plane overhead view of the inner side of the first electrode and FIG. 2*b*) is a sectional enlargement of the outline of a cut-out in the first electrode.

The specific configuration of the first and second cut-outs V1', V2' arranged in opposition on either side of the first or second electrodes 3*a*, 3*b*, as particularly represented in FIGS. 2*a*) and 2*b*), also supports the propagation behavior of the arc in the region of the cut-outs V1', V2', and can effectively prevent any retention or suspension of the arc in the region of the cut-outs V1', V2'.

The cut-outs V1', V2', represented here by the cut-out V1', in the second embodiment, also extend asymmetrically with respect to the longitudinal extension of the cut-outs V1', V2' in the propagation direction of the arc. In particular, the cross-section of the first electrode 3*a* tapers from a first cross-section Q1 to a minimum cross-section QM, in the form of a first linear section L1, and then, in a second linear section L2', increases continuously up to a cross-section Q2, which corresponds here to the cross-section Q1.

A distance l1' of the first linear section L1' is substantially shorter than a distance l2' of the second linear section L2'.

Otherwise, the second embodiment is configured in the manner of the above-mentioned first embodiment.

Figure 3A:
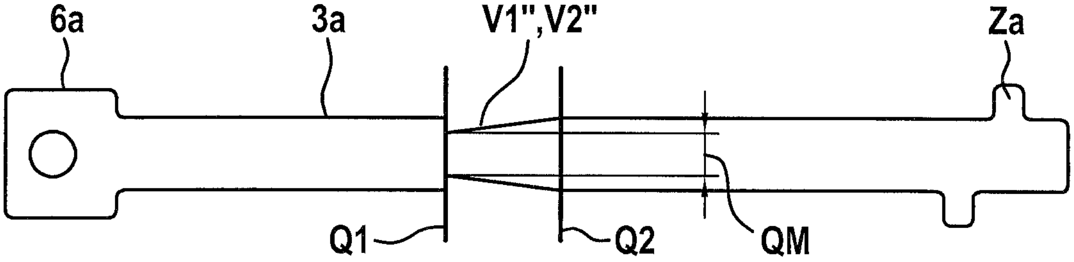
FIGS. 3*a*), *b*) show schematic views for the illustration of a lightning-protection spark gap according to a third embodiment of the present invention, wherein FIG. 3*a*) is a plane overhead view of the inner side of the first electrode, and FIG. 3*b*) is a sectional enlargement of the outline of a cut-out in the first electrode.
Figure 3B:
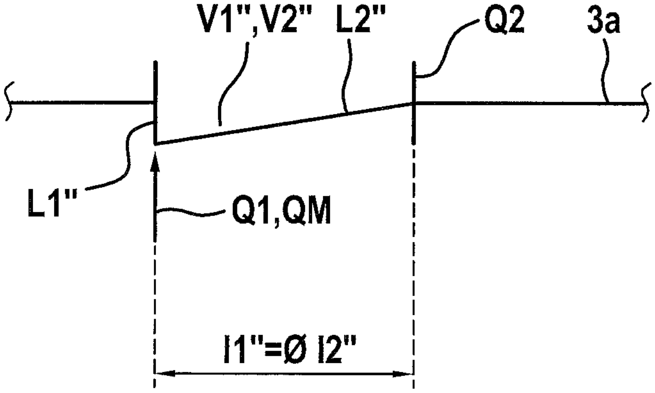

FIGS. 3*a*), *b*) show schematic views for the illustration of a lightning-protection spark gap according to a third embodiment of the present invention, wherein FIG. 3*a*) is a plane overhead view of the inner side of the first electrode, and FIG. 3*b*) is a sectional enlargement of the outline of a cut-out in the first electrode.

The specific configuration of the first and second cut-outs V1", V2", arranged in opposition on either side of the first or second electrodes 3*a*, 3*b*, as particularly represented in FIGS. 3*a*) and 3*b*), in an analogous manner, supports the propagation behavior of the arc in the region of the cut-outs V1", V2", and can effectively prevent any retention or suspension of the arc in the region of the cut-outs V1", V2".

The cut-outs V1", V2", represented here by the cut-out V1", in the third embodiment, extend asymmetrically with respect to the longitudinal extension of the cut-outs V1", V2" in the propagation direction of the arc. In particular, the cross-section of the first electrode 3*a* tapers from a first cross-section Q1 to a minimum cross-section QM, in the form of a rectangular stage L1", and then increases continuously in a linear section L2" over a distance l2" up to a cross-section Q2, which corresponds here to the cross-section Q1. In this embodiment, the first distance l1" is practically zero.

Otherwise, the third embodiment is configured in the manner of the above-mentioned first embodiment.

Figure 4A:
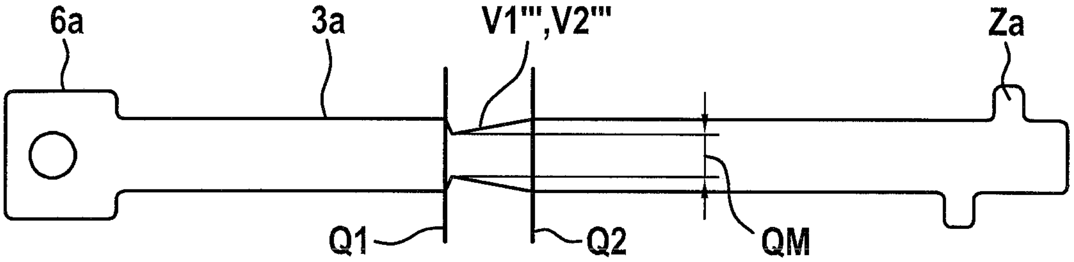
FIGS. 4*a*), *b*) show schematic views for the illustration of a lightning-protection spark gap according to a fourth embodiment of the present invention, wherein FIG. 4*a*) is a plane overhead view of the inner side of the first electrode, and FIG. 4*b*) is a sectional enlargement of the outline of a cut-out in the first electrode.
Figure 4B:
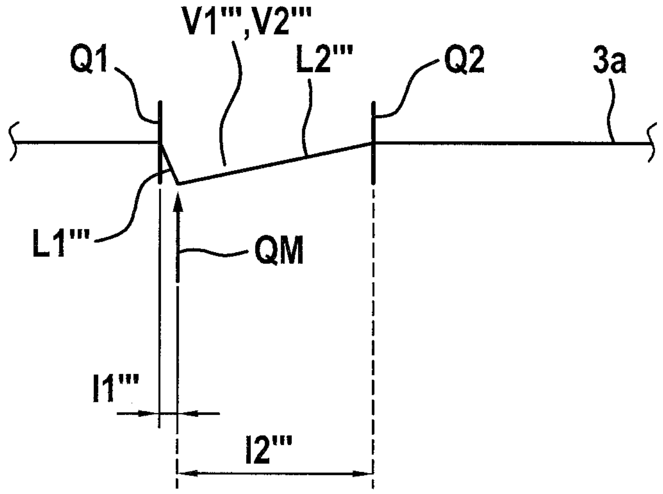
Figure 5A:
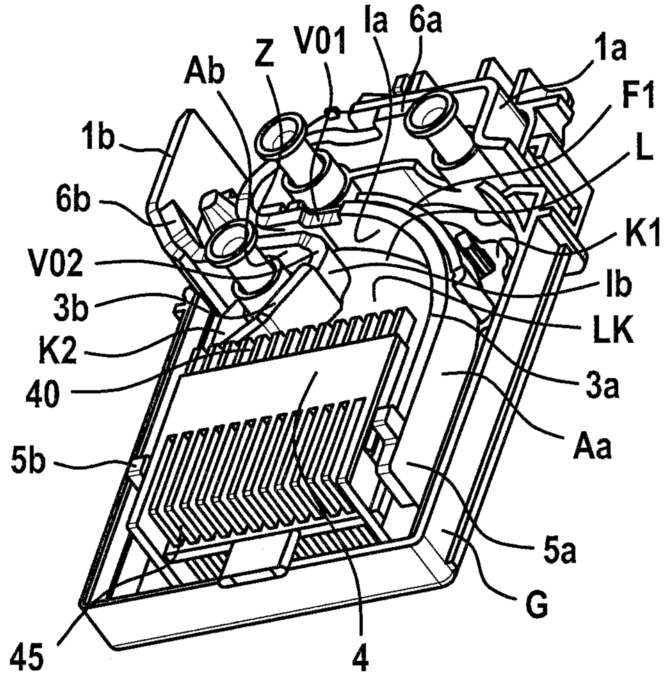
FIGS. 5*a*)-*d*) show schematic views for the illustration of a lightning-protection spark gap which is known from DE 10 2005 015 401 B4.
Figure 5B:
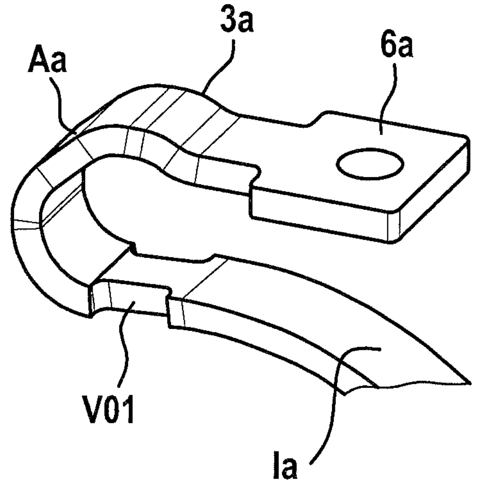
Figure 5C:
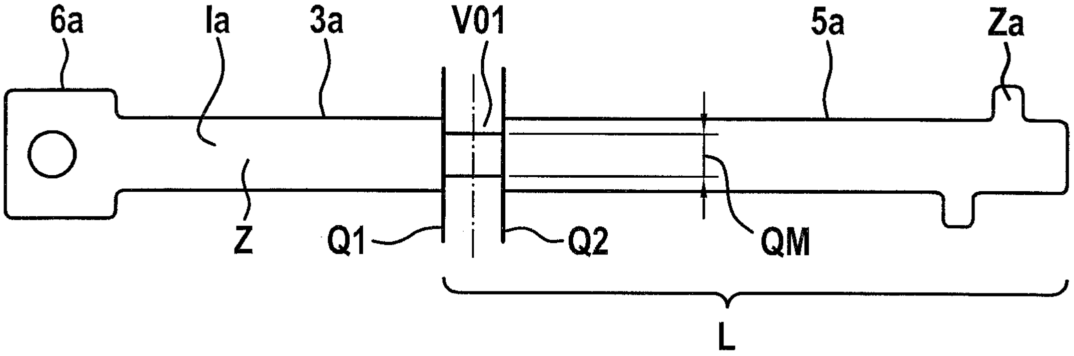
Figure 5D:
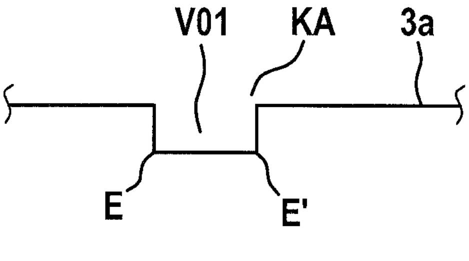

FIGS. 4*a*), *b*) show schematic views for the illustration of a lightning-protection spark gap according to a fourth embodiment of the present invention, wherein FIG. 4*a*) is a plane overhead view of the inner side of the first electrode, and FIG. 4*b*) is a sectional enlargement of the outline of a cut-out in the first electrode.

The specific configuration of the first and second cut-outs V1''', V2''', arranged in opposition on either side of the first or second electrodes 3*a*, 3*b*, as particularly represented in FIGS. 4*a*) and 4*b*), supports the propagation behavior of the arc in the region of the cut-outs V1''', V2''', and can also effectively prevent any retention or suspension of the arc in the region of the cut-outs V1''', V2'''.

The cut-outs V1''', V2''', represented here by the cut-out V1, in the fourth embodiment, extend asymmetrically with respect to the longitudinal extension of the cut-outs V1''', V2''' in the propagation direction of the arc. In particular, the cross-section of the first electrode 3*a* tapers from a first cross-section Q1 to a minimum cross-section QM, in the form of a first linear section L1", and then increases continuously in a second linear section L2''' up to a cross-section Q2, which corresponds here to the cross-section Q1.

A distance l1''' of the first linear section L1''' is substantially shorter than a distance l2''' of the second linear section L1'''.

In comparison with the above-mentioned embodiments, in the fourth embodiment, the configuration of the overall distance l1'''+l2''' of the cut-outs V1''', V3''' is shorter.

Otherwise, the fourth embodiment is configured in the manner of the above-mentioned first embodiment.

Although the invention has been fully described above with reference to preferred exemplary embodiments, it is not limited thereto, but is modifiable in a variety of ways.

In particular, the present invention is not limited to the specific cut-out geometries represented. Likewise, the invention is not limited to the electrode geometries illustrated but, in principle, is applicable to any arbitrary electrode geometries.

Although, in the embodiments described, asymmetrical cut-outs are provided on both electrodes in mirror symmetry in each case, the invention is not limited thereto, and an asymmetrical cut-out can be provided on only one side, on one or both electrodes, or on both sides of only one of the two electrodes.

The invention claimed is:

1. A lightning-protection spark gap, comprising:

a housing (G);

a first electrode (3*a*), having a first outer side (Aa) and a first inner side (Ia), and a second electrode (3*b*), having a second outer side (Ab) and a second inner side (Ib), wherein the first electrode (3*a*) and the second electrode (3*b*) diverge from each other;

wherein, between the first inner side (Ia) of the first electrode (3*a*) and the second inner side (Ib) of the second electrode (3*b*), an ignition region (Z) and a subsequent propagation region (L) for an arc are formed;

wherein the housing (G) forms an arc chamber (LK), which is arranged between the first and second electrodes (3*a*, 3*b*) and which is delimited by a quenching chamber (4); and wherein, in the housing (G), at least one gas circulation channel (K1) is configured, by means of which a gas flow escaping from the quenching chamber (4) in the event of a lightning stroke can be returned to the arc chamber (LK) via at least one first cut-out (V1; V1'; V1"; V1''') in the propagation region (L) of the first electrode (3*a*);

characterized in that the first cut-out (V1; V1'; V1"; V1''') is configured asymmetrically with respect to a longitudinal extension of the first cut-out (V1; V1'; V1"; V1''') in the propagation direction of the arc; and the first cut-out (V1; V1'; V1"; V1'''), in the propagation direction of the arc, decreases from a first cross-section (Q1) of the first electrode (3*a*) to a minimum cross-section (QM) of the first electrode (3*a*) over a first distance (l1; l1'; l1"; l1'''), and increases from the minimum cross-section (QM) of the first electrode (3*a*) to a second cross-section (Q2) of the first electrode (3*a*) over a second distance (l2; l2'; l2"; l2'''); and the first distance (l1; l1'; l1"; l1") is shorter than the second distance (l2; l2'; l2"; l2''').

2. The lightning-protection spark gap as claimed in claim 1, wherein the first electrode (3*a*) comprises two first cut-outs (V1; V1'; V1"; V1'''), which are arranged in symmetrical opposition.

3. The lightning-protection spark gap as claimed in claim 1 wherein, in the housing (G), at least one second gas circulation channel (K2) is configured, by means of which a gas flow escaping from the quenching chamber (4) in the event of a lightning stroke can be returned to the arc chamber (LK) via at least one second cut-out (V2; V2'; V2"; V2''') in the propagation region (L) of the second electrode (3*b*); the second cut-out (V2; V2'; V2"; V2''') is configured asymmetrically with respect to a longitudinal extension of the second cut-out (V2; V2'; V2"; V2''') in the propagation direction of the arc; and the second cut-out (V2; V2'; V2"; V2'''), in the propagation direction of the arc, decreases from a first cross-section (Q1) of the second electrode (3*b*) to a minimum cross-section (QM) of the second electrode (3*b*) over the first distance (l1; l1'; l1"; l1'''), and increases from the minimum cross-section (QM) of the second electrode (3*b*) to a second cross-section (Q2) of the first electrode (3*a*) over a second distance (l2; l2'; l2"; l2'''); and the first distance (l1; l1'; l1"; l1''') is shorter than the second distance (l2; l2'; l2"; l2''').

4. The lightning-protection spark gap as claimed in claim 3, wherein the second electrode (3*b*) comprises two second cut-outs (V2; V2'; V2"; V2'''), which are arranged in symmetrical opposition.

5. The lightning-protection spark gap as claimed in claim 1, wherein the first cross-section (Q1) and the second cross-section (Q2) are equal.

6. The lightning-protection spark gap as claimed in claim 1, wherein the second distance (l2; l2'; l2"; l2''') is at least double the length of the first distance (l1; l1'; l1"; l1''').

7. The lightning-protection spark gap as claimed in claim 1, wherein the first distance (l1; l1'; l1"; l1''') is zero.

8. The lightning-protection spark gap as claimed in claim 1, wherein the first distance (l1; l1'; l1"; l1''') and/or the second distance (l2; l2'; l2"; l2''') extend over at least one curved section (R1).

9. The lightning-protection spark gap as claimed in claim 1, wherein the first distance (l1; l1'; l1"; l1''') and/or the second distance (l2; l2'; l2"; l2''') extend over at least one linear section (L1; L1', L2'; L1", L2"; L1''', L2''').

10. The lightning-protection spark gap as claimed in claim 1, wherein the quenching chamber (4) comprises a plurality of parallel-oriented arc splitter plates (40), to which gas outlet channels (45) connect, which terminate in the first or second gas circulation channel (K1; K2).

* * * * *